United States Patent [19]

Renn et al.

[11] 3,875,044

[45] Apr. 1, 1975

[54] HYDRATABLE GEL SHEETS

[75] Inventors: Donald W. Renn, Glen Cove; Ronald D. Forget, Owl's Head, both of Maine

[73] Assignee: Marine Colloids, Inc., Rockland, Maine

[22] Filed: Feb. 14, 1974

[21] Appl. No.: 442,609

Related U.S. Application Data

[62] Division of Ser. No. 261,154, June 9, 1972, Pat. No. 3,837,960.

[52] U.S. Cl............ 204/299, 23/253 R, 204/180 G, 210/31 C, 210/198 C, 161/113
[51] Int. Cl............................................... B01r 5/00
[58] Field of Search.... 195/103.5; 210/31 C, 198 C; 204/299, 180 G; 161/113; 55/67, 75, 386; 96/87, 85; 23/253 R

[56] References Cited
UNITED STATES PATENTS

| | | | |
|---|---|---|---|
| 3,378,347 | 4/1968 | Sanvis | 23/253 R |
| 3,390,962 | 7/1968 | Goldsmith | 23/253 R |
| 3,767,560 | 10/1973 | Elevitch | 204/299 |
| 3,801,491 | 4/1974 | Cawley | 204/299 |
| 3,808,118 | 4/1974 | Golias | 204/180 G |

*Primary Examiner*—George F. Lesmes
*Assistant Examiner*—R. J. Roche

[57] ABSTRACT

Hydratable gel sheets for use in molecular diffusion processes are made by depositing a layer of hydrated gel material on a water-impervious supporting backing, drying the layer to render it dimensionally stable and to cause it to become bonded to the backing, perforating the layer and the backing in the dry state and then bonding the backing to a second imperforate backing.

2 Claims, 1 Drawing Figure

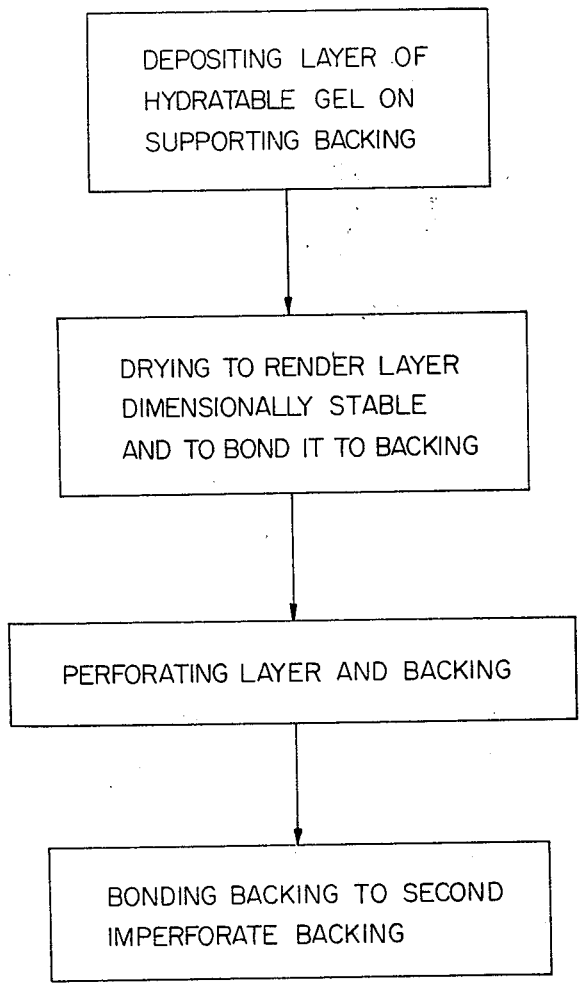

HYDRATABLE GEL SHEETS

This is a division of application Ser. No. 261,154 filed June 9, 1972, now U.S. Pat. No. 3,837,960.

This invention relates to gel sheets for use in molecular diffusion processes such as immunodiffusion, electrophoretic or chromatographic procedures and to a method of making them.

Hydrated gel sheets or films are commonly employed with a supporting backing for carrying out analytical procedures by means of electrophoresis or chromatography. In one mode of proceeding a well is provided in the sheet or film into which the test solution is placed; in such a procedure it is important, in order to obtain precise and reproducible results, that the walls of the well be uniformly perpendicular to the surface. As conventional method of making such wells has been to apply a hollow suction die or punch having a cutting edge defining the desired size and shape of the well to the fresh hydrated gel layers, before it becomes adherent to the backing, thus cutting the walls of the well and sucking away the gel core in a single operation. The gel sheet is thereafter dried, causing it to bond firmly to the backing; before use, it is again hydrated by immersion in water or aqueous electrolyte solution. Because of the rubbery and resilient nature of the hydrated gel sheet, which usually is from 1 to 2 millimeters thick, and because of its slipperiness and tendency to slide on the surface of the backing before the initial drying step, this mode of manufacture has lacked the high degree of precision required to provide reproducible wells of the desired size and shape having a wall or walls uniformly perpendicular to the surface throughout their extent.

By the method of the present invention the hydrated gel sheet or film is first dehydrated or dried while on its supporting backing, thus causing it to shrink and become bonded or adhered to the backing, then the assemblage of gel and backing is cut or punched by any conventional means to provide an opening of the desired size and shape extending through both the dried gel sheet and the backing, after which the assemblage is bonded to a second, imperforate backing, the two backing sheets being in contact with each other to leave the gel sheet exposed, the second backing providing a bottom for the openings in the gel sheet.

The gel sheet or film after dehydration bonds firmly to the first backing and acquires a stable structure which is relatively firm and rigid and which maintains its shape and dimensions to a marked degree when cut or perforated with conventional paper cutting or perforating equipment.

In the drawing there is shown diagrammatically a simplified flow sheet of the process of the invention.

The hydratable gels which can be employed in the practice of the present invention include agar, agarose, gelling carrageenan, for example potassium carrageenan, gelling alginates, for example calcium alginate, gelling pectins, polyacrylamides, polyhydroxy polyacrylates, regenerated cellulose acetate gel, deacetylated chitin, dextrans, regenerated cellulose, galactomannans, mucopolysaccharides, and xanthan gums. Cross-linked varieties of any of the foregoing which contain two or more hydroxy groups can also be used. In short, any of hydratable gel materials commonly used for molecular diffusion procedures such as electrophoresis or chromatographic procedures may be employed.

The supporting backing employed can be any of those commonly used for this purpose; preferably it is a sheet or film of water-impervious polymeric material which is dimensionally stable in water and in air and which can be cut or perforated readily with ordinary paper-cutting or perforating equipment. Materials commonly employed as the supporting backing for photographic films are eminently suitable, including such thermoplastic materials as cellulose esters e.g. cellulose acetate or butyrate, vinyl polymers such as polyvinyl acetate, polyvinyl butyral, polyacrylic esters, polyethylene terephthalate, and the like. The backing can be of any conventional or desired thickness; for example, from 0.1 to 4 mm.

The extent of drying of the gel sheet, which is usually 1–2 mm. in thickness, required before carrying out the perforating step is not critical and varies to some extent depending on the precise identity of the gel material. It is desirable to dry it to the extent necessary to obtain a bond between the gel sheet and the supporting backing so that one will not slide or slip with respect to the other during the perforating step, and it is also important to dry it to the extent that the gel sheet is no longer rubbery and elastic to the extent that it distorts and changes shape substantially during the perforating step. This usually requires that the gel material contain no more than about 10% by weight of water.

The assembly of dried gel sheet bonded to its supporting backing can be cut or perforated by any conventional cutting knife, punch, die, twist drill, laser knife, electrical discharge, or other perforating device of suitable size and shape. For example, circular perforations having a diameter of the order of 1 to 10 mm. wide or slots 0.1–2 mm. wide and 5 to 60 mm. long or any combination are suitable.

After completion of the perforating step the bottom or exposed face of the supporting backing is bonded to a second, imperforate supporting backing sheet. The materials of the two backing sheets may be the same or different, and the thickness of the two backing sheets may also be the same or different. Most conveniently the same material is used for both, and the thickness may be the same, of the order of 0.5 to 4 mm., for each backing sheet. Any suitable conventional adhesive or bonding agent may be used. In the case of the usual thermoplastic backing sheets the two can be bonded together simply by heat sealing provided the layer of hydratable gel is stable under the heat and pressure conditions required.

EXAMPLE

A layer of rehydratable agarose gel was formed by the procedure described in Renn et al. U.S. Pat. No. 3,527,712 on a backing consisting of a flexible sheet 1 mm. thick of polyethylene terephthalate having a hydrophilic surface provided by a thin film of resin and of gelatin as described in U.S. Pat. Nos. 2,627,088 and 2,698,235 and sold under the trade name Cronar. The agarose gel layer, after drying in the air at 30°–60°C. for 1 to 4 hours, had a water content of about 10% by weight and was 0.2 mm. in thickness. The agarose gel layer was bonded firmly to the layer of polyethylene terephthalate. The assembly was readily perforated by means of a paper punch to provide clean-cut circular holes about 5 mm. in diameter spaced 4 mm. apart. This perforated assembly was then bonded to another sheet of the same polyethylene terephthalate by a suitable adhesive, e.g., a polystyrene cement, pyroxylin-based cement, (or even water alone which softened the gelatin layer), which provided a clear laminate without disturbing the molecular diffusion properties of the rehydratable gel.

The finished product contained circular wells having sharply defined walls perpendicular to the upper exposed face of the agarose as well as to the interface between the agarose sheet and the backing. When the product was immersed in water at 25°C. for 1 hour, the agarose gel became rehydrated, swelling to a thickness of 1½ mm. The walls of the wells retained their clean cut configuration and remained perpendicular. When used in electrophoresis, patterns of superior clarity and resolution were obtained, in contrast to the results obtained by cutting a well in the same agarose gel on the same backing layer while the gel was still wet and before it had dried.

What is claimed is:

1. A hydratable gel medium for use in molecular diffusion processes comprising a three-layer bonded assembly including a first layer of hydratable gel material, and second and third layers of water impervious supporting material, said first and second layers having mating openings extending completely therethrough with the walls of said openings perpendicular to the faces of said first and second layers and said third layer being imperforate, all three layers being bonded together throughout their opposing faces.

2. A hydratable gel medium as claimed in claim 1 in which said gel material is agarose and said supporting material is a thermoplastic polymeric material which is dimensionally stable in water and air.

* * * * *